Feb. 10, 1953 — L. E. LANGDON — 2,628,190
METHOD OF TREATING SEWAGE OR OTHER WASTE MATERIAL
Filed Aug. 31, 1949 — 3 Sheets-Sheet 3
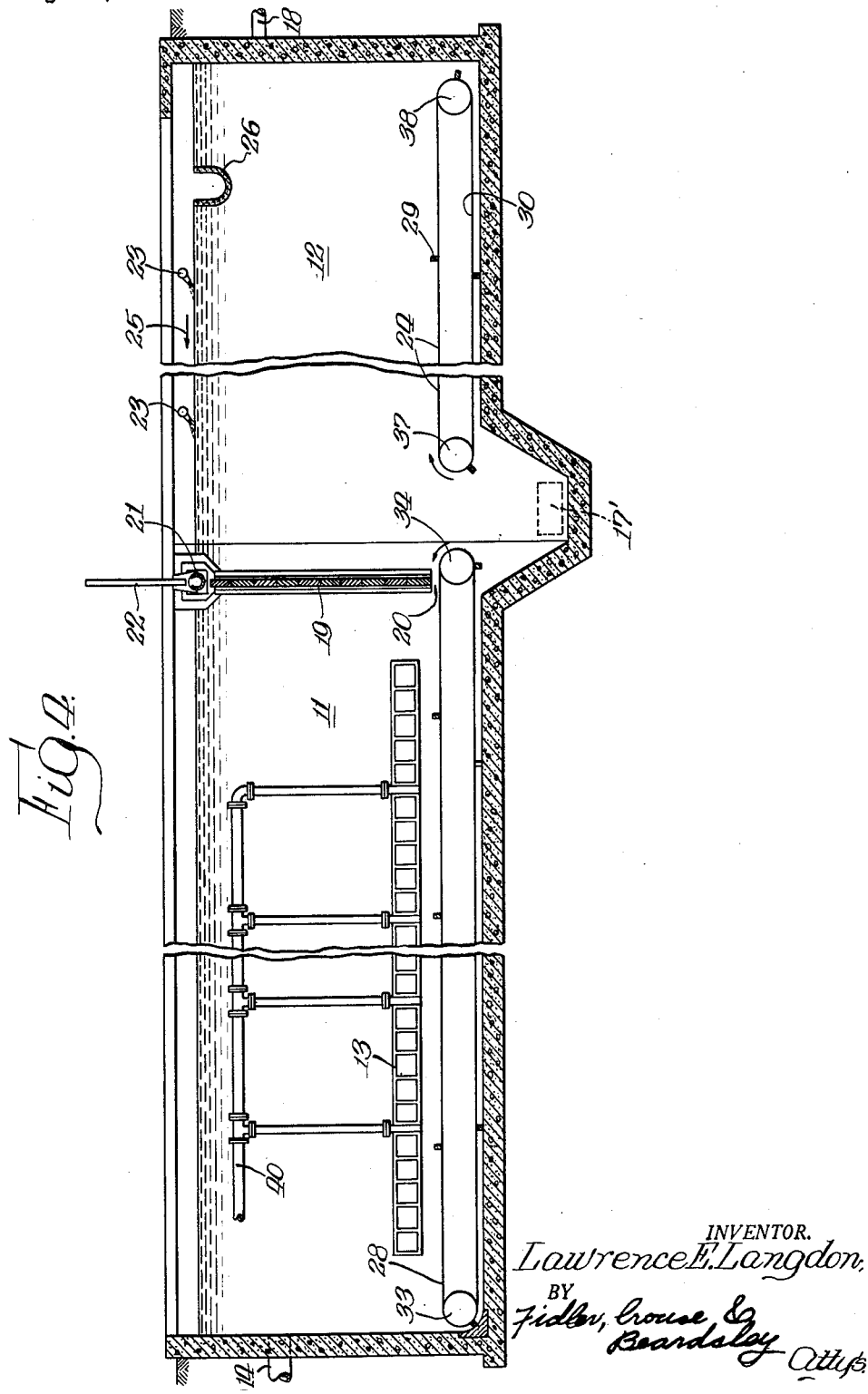
INVENTOR.
Lawrence E. Langdon,
BY Fidler, Crouse & Beardsley
Attys.

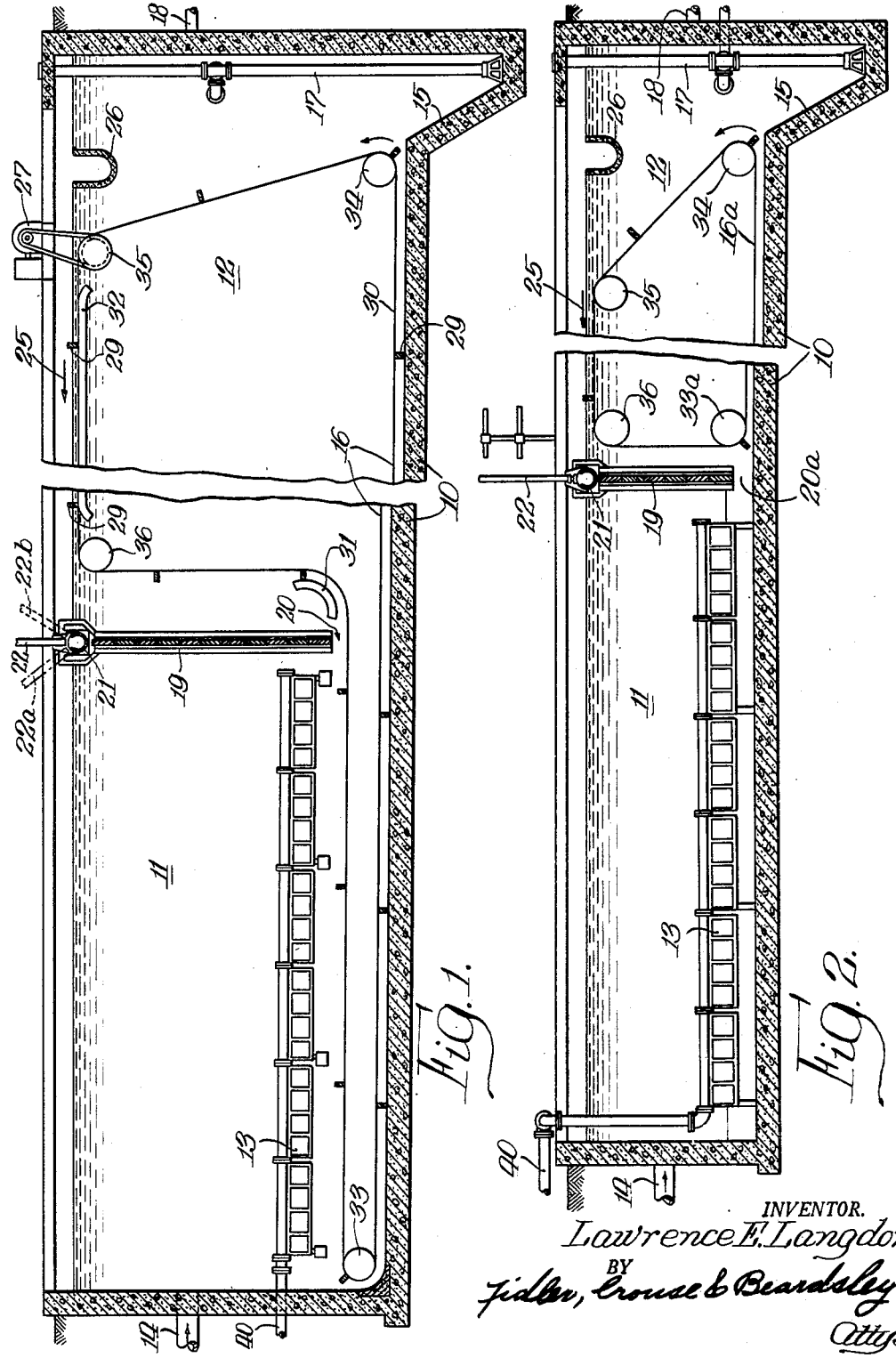

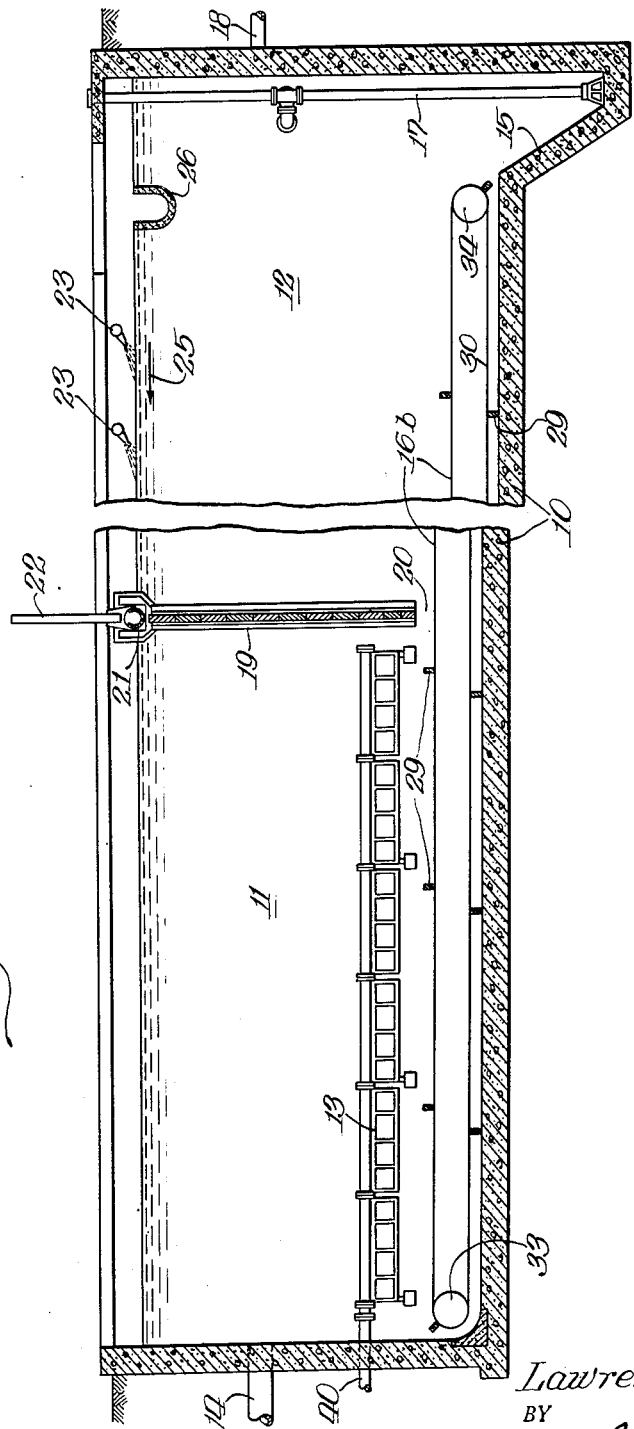

Patented Feb. 10, 1953

2,628,190

UNITED STATES PATENT OFFICE 2,628,190

METHOD OF TREATING SEWAGE OR OTHER WASTE MATERIAL

Lawrence E. Langdon, Wilmette, Ill., assignor, by mesne assignments, to Link-Belt Company, Chicago, Ill., a corporation of Illinois Application August 31, 1949, Serial No. 113,309

5 Claims. (Cl. 210—3)

My invention relates generally to the treatment of sewage or other waste material and it has to do particularly with primary treatment thereof wherein the material is initially subjected to aeration and then quiescent settling in a single treatment unit. This invention is an improvement upon the method covered by my United States Letters Patent No. 2,370,974, granted March 6, 1945.

Although the method of my said patent has been employed successfully in various instances, it has been found that, with the trough for removal of floatable substances located in close proximity to the effluent discharge, there is a tendency at times for some of the floatable material (sometimes referred to as "scum") to pass into the effluent discharge opening where it is discharged with the treated effluent. When this condition exists the floatable substance causes contamination of the treated effluent, which is highly objectionable. For example, should the point of disposal be a stream, the grease and oils will rise to the surface of the stream, causing unsightliness or odors and inhibiting the ability of the stream to absorb oxygen from the atmosphere. If such greasy or oily substances are carried to a secondary treatment zone they may there become separated from the particles to which they were attached, in sufficient quantities to upset or interfere with the process of the secondary treatment.

Also, in practicing the method of my said patent, it has been found that in certain instances, with the settled solids from both the aeration and settling zones finally collected in the bottom of the aeration zone, the disturbance of the solids in the removal sump due to air agitation is such that the solids were not concentrated to a desired extent and greater amounts of fluid than desired were discharged with the solids, requiring large digesting apparatus which, obviously, resulted in increased cost of installation. Although this condition did not, nor does not, interfere with the intended and efficient functioning of the method of my said patent, it has been found that such practice may be materially improved upon according to my present invention.

One of the objects of my invention is to eliminate the foregoing disadvantages of prior practice.

Another object is to provide for improved aeration and quiescent settling in the primary treatment of sewage in a single treatment unit.

A further object is to provide for the collection of the settleable solids from both the aeration and settling zones in a common solids collection zone outside the aeration zone and within the limits of the quiescent settling zone where such solids are unaffected by agitation of the aeration zone.

Still another object is to provide for aeration and quiescent settling in a single primary treatment unit with separation of the floatable solids and discharge thereof at a point far remote from the point of removal of the treated effluent so as to avoid any possible discharge of such floatable material or scum with the effluent discharge.

A further object is to provide a method of treating sewage by aeration and quiescent settling in a single treating unit and wherein the settled solids from both the aeration and settling zones are collected at a point of quiescence in the settling zone adjacent the effluent discharge thereof with removal of floatable substance or scum at a point remote from the point of settling of such solids and the effluent discharge and in close proximity to the aeration zone.

An additional object is to provide an arrangement whereby the settled solids are collected at a point of quiescence in a highly concentrated form, thereby reducing the volume of sludge to be removed and placing such sludge in improved condition for discharge to the digester. With this arrangement, it is possible to utilize lesser sludge digester volume or make more effective use of digester volume already provided in a given installation.

A further object is to provide a primary treatment for sewage material which not only insures a more highly concentrated sludge but reduces the amount of water taken into the sludge digestion tank or means, which arrangement also insures a greater detention period in the digestion tank, thereby insuring more complete digestion with the separation of less supernatant liquor from the digestion tank to be sent back to the main treatment process.

An additional object is to provide an improved method wherein aeration in the inlet portion of the treating unit may agitate the material sufficiently therein to prevent settling of solids at that point, such agitated material being discharged to the quiescent settling zone wherein complete settling of the material is effected with discharge of the settled solids to a quiescent settling sump or zone, from which such solids may be removed without agitation and without disturbing the content in the quiescent settling zone.

Other objects and advantages will become obvious as this description progresses and by reference to the accompanying drawings wherein:

Figure 1 is a sectional view, partially diagrammatic, of a preferred form of structure which may well be employed in carrying out my invention;

Figs. 2 and 3 are views similar to Fig. 1 of other forms of structure that may be employed in carrying out my invention; and Fig. 4 is an additional embodiment of another form of structure that may be employed in carrying out my invention.

My invention involves primarily the flow of raw untreated sewage to a primary treatment zone wherein such material is first subjected to aeration and then to quiescent settling. The aeration is accomplished by agitation of such violence as to secure a separation or release of floatable material and substances from suspended particles, to secure the removal of all gases, to produce flocculation or agglomeration of finely divided, dispersed or colloidal substances, to oxidize to an insoluble form substances of a soluble nature and to introduce to the sewage or waste material dissolved oxygen for freshening the sewage. In the quiescent settling action that immediately follows aeration, the floatable material so separated floats to the top of the surface of the material being treated and the settleable solids settle to the bottom of the tank. Clarified effluent is discharged from the primary treatment zone for secondary treatment substantially free from objectionable fatty, oily and greasy substances or the like. The floatable material that rises to the surface of the aeration zone and the primary clarifier or quiescent settling zone is separately removed and discharged to a point of disposal which may be a digestion tank or other suitable means. The floatable material is preferably removed between the aeration zone and the quiescent settling zone and at a substantial distance from the point of discharge of the clarified effluent so that none of the floating solids may contaminate the effluent. This is arranged by the relative location of the scum removal trough with respect to the effluent weir and by suitable devices for skimming the scum toward the scum removal trough and away from the effluent weir by the arrangement of the flights of the solids conveyor or by other suitable skimming devices such as air or water jets impinging on the surface of the primary clarifier to cause movement of the scum away from the effluent weir toward the scum removal trough.

The settled solids are also removed from the point of settling to a collection chamber from which they may be discharged to a point of disposal. The removal of the solids from the inlet to the effluent end of the tank is at such a rate that there will be no disturbance in the settling zone so that the solids are rendered more concentrated. In practice, two feet per minute scraper travel of the conveyor is preferred but this rate may be varied to meet the conditions of the material under treatment. The removal of the floatable substances and settled solids is preferably accomplished by a single conveyor means although the arrangement of the aeration zone and the primary clarifier is such that the removal of the floatable substances and settled solids may be accomplished by a single conveyor extending into both zones or a single conveyor in the primary clarifier or with conveyors in each of the zones so arranged as to discharge the settled solids from both the aeration and settling zones into a common solids collection point in order to secure greater concentration of the solids as they are removed from the solids receiving chamber. The location of the solids receiving chamber of the various embodiments of the invention is such that there is no disturbance of the solids in the removal sump or solids receiving chamber due to air agitation. The aeration or removal of the solids from the inlet to the effluent end of the treating unit is such that there will be no disturbance in the settling zone and so that the solids are rendered more concentrated when they are finally removed. To the foregoing end, the solids receiving chamber is located within the limits of the quiescent settling zone, preferably either at the end of the treating unit underneath the effluent weir or adjacent the point of discharge of the settleable solids from the aeration zone to the quiescent zone.

It has been found in the practice of this invention for the treatment of raw sewage that the air causes a flocculation effect and makes the solids settle better. For example, it has been found in practice that there is obtained 80% removal of suspended solids with from 45% to 50% 5-day B. O. D. removal. This is quite an improvement as compared to the conventional arrangement of sedimentation where there would not be obtained more than 25% to 35% B. O. D. removal and 60% removal of suspended solids.

With my novel method of subjecting raw untreated sewage and other material, in the various embodiments of this invention to be later described in detail, to a primary treatment, it is possible to remove more concentrated sludge than with various arrangements of the prior art. This means that there is less volume of sludge for removal and the sludge is in better condition for discharge to the digester. Therefore, it is possible to utilize lesser digestion volume or make more effective use of the digestion volume (tanks) that are already provided. It also means that there is less water taken into the digestion tank, requiring the separation of less supernatant liquor to be brought back to the main treatment process. It also provides for a greater detention period in the digestion tank, allowing more complete digestion.

In the drawings I have shown several structures which are well adapted for carrying out my invention and like reference characters will denote the same or similar structures. Referring first to the structure of Fig. 1, it includes a tank 10 which I may term the primary treatment tank and which constitutes the primary treatment zone. This tank is provided with an aeration zone 11 and a settling section or zone 12. An aerating device 13 is located in the aeration zone 11 as illustrated in the various modifications.

The tank is provided with a raw sewage inlet conduit 14 for delivering raw sewage directly into the aeration zone 11. This inlet has been shown schematically; but, if necessary, it may take the form of a transversely extending weir so dispersed at the tank inlet that the sewage may be fed into the inlet chamber without materially disturbing or agitating the material in the chamber. The tank 10 is further provided with a solids receiving chamber 15 which is located beneath the quiescent settling zone 12. The solids receiving chamber 15 is adapted to receive solids that settle in the aeration and settling zones 11 and 12 directly from the settling zone 12, it being discharged thereinto by suitable conveying means 16. The solids which are discharged into the solids receiving chamber 15 and concentrated therein may be suitably withdrawn by a sludge draw-off means 17 for discharge to a common sludge receiving chamber (not shown) from which they are discharged through a sludge draw-off connection 18. The sludge draw-off means 17 may be of any suitable and well known form.

The inlet chamber or aerating zone 11 is separated from the settling chamber or zone 12 by a laterally dispersed, vertically extending baffle construction which may take the form of wood planks vertically mounted in a groove formed by angle irons mounted on the wall of the tank. The baffle 19 is positioned above the bottom of the tank to form a passageway 20 (Fig. 1) of such size as to permit operation of the conveyor therethrough and to permit the discharge of the fluid containing settleable solids from the aeration zone to the quiescent settling zone.

The tank or primary treatment unit 10 of each of the embodiments of my invention further includes a scum removal trough construction 21 suitably mounted above the baffle 19. The scum removal trough is substantially circular in cross-section with a segment thereof extending transversely of the tank removed forming an opening so that in the position shown, with an operating handle in the verticle position, floatable substances or scum cannot be discharged from either the aeration zone 11 or the settling zone 12. However, in the dotted position 22a (Fig. 1) with the handle moved to the left, the scum removal trough construction is rotated to a position so that it is adapted for skimming the scum and floatable substances from the aeration zone 11. With the handle moved to the position 22b to the right, the scum removal trough 21 is adapted for skimming the scum and floatable substances from the surface of the fluid in the quiescent settling zone caused by the movement toward the scum removal trough by the flight of the conveyor 16 skimming the surface of scum.

In the embodiments of Figs. 3 and 4, this scum removal is accomplished by impinging jets of air or water under suitable pressure from nozzles 23 arranged above the level of the liquid within the compartment 12 and discharged at such an angle as to cause movement of the scum toward the scum removal trough.

It is also within the scope of the invention that a mechanical type of scum remover may be used similar in form to the conveyor 24, Fig. 4, for moving the solids to the solids receiving chamber 15. However, it is to be understood that the direction of movement of the flights of the conveyor for moving the scum shall be in the direction of the arrows 25 simulating the motion of the flights of the conveyor 16 of the preferred embodiment of Fig. 1 for removing the scum.

Each of the embodiments of my invention is provided with an effluent weir construction 26 for discharging the clarified effluent. It is preferred that the effluent weir shall be located at the remotest point from the influent opening 14 for the raw sewage and at the remotest part of the quiescent settling zone and remote from the point of removal of the floatable material of the aeration zone and the quiescent settling to prevent any of the floating solids from passing into the weir and contaminating the clarified fluid.

It is preferred to drive each of the conveyors of the several embodiments of my invention by a suitable motor and reducer drive unit 27, as illustrated schematically in Fig. 1, for driving the conveyor 16. Although not illustrated in the other modifications of the invention, a suitable motor and reducer drive unit may be used for driving, for example, the conveyors 16a, 16b, 28 and 24 respectively of the embodiments of Figs. 2, 3 and 4.

In each embodiment of my invention the conveyor structure is substantially the same, the only difference being in the arrangement. Referring to the embodiment of Fig. 1, the conveyor comprises wood flights 29 carried by suitable conveyor chain construction 30. In order to guide the conveyor where the flights extend through the opening 20 (Fig. 1) underneath the baffle 19, a suitably formed angle track 31 is affixed to the wall of the tank and curved to a suitable radius. Another angle flight track 32 is provided to hold the flights 29 at the proper elevation at the surface of the quiescent settling zone for skimming the liquid surface. It is preferred that the ends of the flights 29 will be equipped with wearing shoes at the top and bottom ends of the flights 29 to ride on the angle tracks. Although not illustrated, similar angle flight track construction may be used for the horizontal upper portion of the conveyor within the aeration tank and may also be used elsewhere wherever needed to provide a satisfactory operating conveyor construction.

The conveyor 16 arranged as illustrated in Fig. 1 is supported by suitable sprockets 33, 34, 35 and 36 suitably driven through the motor and reducer drive 27. The sprockets are so arranged that the conveyor flights move in close proximity to the bottom of the entire tank 10 and the upper level of the liquid in the quiescent settling zone 12. The conveyor 16 is provided with the laterally extending and preferably equally spaced flight scraper members 29 which are of sufficient depth to sweep the tank bottom and remove solids therefrom and also to sweep along and above the upper surface of the material in the quiescent settling chamber 12 and remove the floatable substances therein into the scum removal trough positioned in the position indicated by the dotted position 22b of the operating handle. At the right end of the conveyor, the sprocket 34 is so located as to discharge solids swept along the bottom of the tank by the conveyor paddles 29 directly into the solids receiving chamber 15.

The upper sprockets 35 and 36 (Fig. 1) forming the skimming device for skimming the surface level of the quiescent settling chamber 12 are positioned so that the sprocket 35 is at a distance from the effluent weir 26 to prevent any of the floatable substance to be discharged into the weir while the sprocket 36 is located sufficiently close to the scum removal trough so that the floatable substances swept along by the conveyor paddles at the left of the chamber 12 are discharged into this transverse trough member 21. It is to be understood that a variable speed drive may be utilized to adjust the speed of the conveyor 16 to the proper rate for skimming and at such a rate that there will be no disturbance in the settling zone so that the solids are rendered more concentrated.

Although not illustrated, suitable angle flight construction for the conveyors may be provided for the conveyors illustrated schematically in the other embodiments of Figs. 2, 3, and 4.

In the embodiments of Figs. 1 and 3, the horizontal flight portion of the conveyor for carrying the settleable solids from the aeration zone into the quiescent zone is positioned below the aerating device to provide a zone in which the highly aerated influent raw sewage may have a chance for the settleable solids to settle out. The aerator may be operated to accomplish this or in such a way as to completely agitate the material in the aeration zone 11 throughout and prevent settling therein.

In further carrying out my invention in the various embodiments, and particularly in the manner exemplified, for example in Fig. 1, material from the inlet chamber 11 of the tank is agitated and thoroughly aerated without disturbing the material in the settling chamber 12 where a quiescent settling action takes place. The agitation and aeration referred to is accomplished by the aerator 13 which is illustrated schematically in the various modifications and is usually placed along one wall of the tank discharging the air for aeration inwardly along one wall. It is also within the scope of the invention that the aerating device 13 may be positioned close to each side wall and intermediately located within the length of the tank discharging in opposite directions to form a plurality of substantially isolated areas within a common tank operating as separate tanks but without any intervening walls.

The aerating device 13 preferably comprises a combination air main and air diffuser plate holder for the air diffuser plates which may be in the form of separated parallel diffuser plates or suitably formed diffuser plates positioned at an angle to direct the water under pressure toward the center of the tank. The large volumes of air necessary and at the required velocity for the air diffuser may be supplied by a suitable air compressor (not shown) connected to the air main 49 of the air diffuser. Although there has been schematically illustrated a suitable form of aerating device as an air diffuser, it is to be understood that any other suitable form of aerating device which will provide substantially the same action to aerate and flocculate the material, while either permitting heavier solids to settle to the bottom of the aeration tank or causing complete agitation throughout to prevent settling, may be used.

In the preferred form of the invention as illustrated in Fig. 1, only enough air is fed to aerate and flocculate the material in the inlet or aeration portion of the device while permitting the heavier solids to settle to the bottom of the inlet portion for removal. In this form, the conveyor 16 passing through the inlet portion for the removal of the settled solids therein is required. A similar action takes place in the embodiment of Fig. 3 requiring the use of the conveyor 16b.

A similar action, as in Figs. 1 and 3 with respect to the operation of the aerating device, takes place in Fig. 4, and the conveyor 28 is likewise used for removal of the settled solids therein to a settled solids or sludge draw-off chamber 15′.

In the embodiment of Fig. 2, the aerating device 13 may also be operated to aerate sufficiently to agitate the entire inlet section 11 rather than the upper portion thereof as illustrated in the embodiments of Figs. 1 and 3, to keep the solids from settling. This form as illustrated in Fig. 2 does not require a conveyor in the aeration section 11 as the liquids with the settleable solids flow directly to the quiescent settling zone for final separation and withdrawal by the conveyor 16a.

It has been found in practice that aeration may be required for a period of from 5 to 45 minutes, dependent on the strength and character of the waste being treated. Normal domestic sewage, for example, requires from 20 to 30 minutes. It has also been found that excellent results may be obtained when one-fourth of a cubic foot of air per gallon of raw sewage to be treated is employed for the purpose of agitation, but this may be varied according to the condition of the sewage being treated and under some conditions may go down as low as 1/60 of a cubic foot per gallon of raw sewage to be treated. It is to be understood that with highly concentrated, or septic, or stale wastes, a much larger volume of air is required.

The action within the aeration chamber 11 of completely breaking up the material into minute particles discharged into the chamber under the action of the aeration device 13 provides an effective aeration of the material by getting as much surface area of the material in contact with as much air as possible. As a result, by breaking up the sewage material into as small particles as possible, a maximum surface of the material is exposed to the air for aeration or oxygenation. Also, since the unit operates with a sufficient pressure of air to deliver the required amount of air per gallon as set forth above in the period of time in which the raw sewage is treated, an economical method is had for diffusing large volumes of air to assure adequate aeration of the sewage under treatment.

Any of the floatable substances separated in the aeration zone by this treatment tend to float to the surface where they are removed through the scum removal trough 21 by placing the scum removal trough in the position illustrated at 22a. The aerated particles, particularly the settleable solids of the material under treatment, then settle back down and are collected at the bottom of the aeration chamber where the heavy particles are discharged to the solids receiving chamber by the conveyor 16, and the lighter particles still in suspension are allowed to flow out of the aerating chamber through the opening 20 into the quiescent settling zone 12 to further settle out.

In the aerating action just explained, a large part of the gases entrained in the aerating material are released therefrom, colloidal material is broken down into settleable form so that when it is delivered to the settling chamber 12 such material will readily settle. This aeration action also is such as to separate oily, greasy, fatty and other floatable substances from the solids in the material so that when the aerated material is delivered to the settling chamber 12, these materials readily float to the surface of the material in such chamber and also the floatable substances separated in the aeration chamber readily ascend to the surface of the aeration chamber 11 as previously described and may be readily removed therefrom. Floatable substances removed in the quiescent settling zone 12 are then discharged through the scum removal trough by positioning the operating handle in the position 22b, and it is obvious that by this arrangement, there is no contamination of the clarified effluent discharging through the weir 26.

In carrying out the novel method of my invention in each of the various embodiments of my invention, removal of both the floatable substances and solids which collect in the aeration chamber 11 and the quiescent settling chamber 12 is accomplished in the following manner. Referring to Fig. 1, the conveyor is positioned as illustrated with the various flights thereof as shown to convey the settled solids from the aeration zone and the quiescent settling zone to the solids receiving chamber 15. A portion of the conveyor 16 moving in the direction of the arrow 25 serves to skim the surface of the settling tank toward the scum removal trough 21. When used in this manner, the scum removal trough is adjusted to the position shown by the dotted position 22b of the operating handle. The trough 21 is connected in any suitable manner to a point of disposal which may be in common with the chamber and from there to a point of disposal such as a digester (not shown). It is thus evident that the conveyor mechanism not only skims the surface of the settling portion of the treating unit but also removes the sludge from the entire aeration and sedimentation portions of the tank. The agitation and aeration of the material in the aeration zone is as previously described above in detail.

Also in carrying out the method of my invention, the structure shown in Fig. 2 may be employed. The structure of Fig. 2 is substantially similar to that of Fig. 1 except that the aeration at the aeration zone is such as to agitate the entire inlet section and keep the solids from settling. With this construction, it is not necessary that the conveyor extend within the pre-aeration zone 11 and the conveyor 16a is only necessary in the quiescent settling zone 12 having the flights and the sprockets 33a, 34, 35' and 36 thereof arranged as shown. In this modification, the settleable solids within the highly aerated raw sewage under treatment discharge through the narrow opening 20a flowing into the quiescent settling zone with an upflow thereof through a sludge blanket which is being conveyed to the solids receiving chamber 15 as previously described. As the operation of the apparatus of this embodiment with respect to the removal of the floatable substances from the surface of the pre-aeration zone and the quiescent settling zone 12 is the same, further description of the operation is believed unnecessary.

Also in another embodiment for carrying out the method of my invention, Fig. 3, the aeration of the raw sewage under treatment in the aeration chamber 11 is similar to that described with respect to Fig. 1 and the settleable solids separated out in the two zones are removed by the conveyor 16b extending through these two zones to be discharged and concentrated in the solids receiving chamber 15 as previously described. In this embodiment, instead of forming the conveyor as in Fig. 1, the conveyor including the sprockets 33 and 34 located as shown is arranged as illustrated, the floatable substances being removed from the surface of the quiescent settling zone by impinging jets of air or liquid from the nozzles 23 as illustrated to cause the floatable substances to flow in the direction of the arrow 25 toward the scum removal trough 21. The floatable substances from either the aeration zone 11 or the quiescent settling zone 12 may be removed as previously described to a suitable scum and sludge draw-off pit for the material to be digested and from there to a digester (not shown).

Likewise in the embodiment of Fig. 4 for carrying out the method of my invention, there is disclosed a method of concentrating the settleable solids and removal of the scum from the pre-aeration zone 11 and the quiescent settling zone 12. In this method, the raw sewage under treatment in the zone 11 is aerated as described previously with respect to the embodiment of Fig. 1. In this embodiment, Fig. 4, it is preferred to diffuse the air from groups of laterally spaced air diffusers 13 between which are positioned conveyors 28 in each of the sections for removal of the settleable solids which separate therefrom to a solids receiving chamber 15' for concentration. The liquid which contains the settleable solids which have not settled out discharges from the pre-aeration zone through the opening 20 into the quiescent settling zone 12 where the solids settle out as previously described. The conveyor 24 comprising the usual paddle flight members 29 mounted on the conveyor chain 30 is mounted on sprockets 37 and 38 and suitably driven through a motor and reducer drive means (not shown) to move the conveyor in the direction of the arrow for the discharge of the settleable solids from the quiescent settling zone 12 into the solids receiving chamber 15'. With this embodiment, it is evident that the solids from each of the chambers 11 and 12 are conveyed to a common solids collection point and rendered more concentrated. As the removal of the floatable substances from the aeration zone 11 and the quiescent settling zone 12 is the same as that described with reference to the embodiment of Fig. 3, further description of the operation will not be given.

It is thus obvious that there has been disclosed several embodiments of my invention in which the method of subjecting raw untreated sewage to primary treatment in a single treatment unit is substantially the same. In each of these embodiments, the raw sewage is completely aerated for the separation of the floatable substances and the settleable solids therefrom; and, after this treatment, the liquids having therein the settleable solids which have not entirely settled out are discharged into the quiescent settling zone to completely settle out the settleable solids and to permit any floatable substances not settled out in the pre-aeration zone to be completely settled out.

The floatable substances from each of the zones are skimmed from the surface of each zone by a suitable scum removal trough arranged to remove the floatable substances from the surface of each of the zones. Also in each of the embodiments, a suitable skimming means is provided for skimming the floatable substances in the quiescent settling zone to the scum removal trough which is at a point remote from the weir for the discharge of the clarified effluent to prevent contamination of the clarified effluent with any of the floatable substances on the surface of the quiescent settling zone.

In each of the embodiments, the settleable solids from the two zones are discharged to a common solids receiving chamber to secure greater concentration of the solids as they are removed from the tank. Furthermore, the apparatus is arranged so that there is no disturbance of the solids in the removal sump due to air agitation as in the aforementioned patent where the solids receiving chamber is located in the inlet end of the treating unit.

It is also obvious that there has been disclosed various embodiments of the invention which provide for better aeration and settling action than in the arrangements of the prior art. The devices disclosed insure against agitation in a quiescent settling zone which might otherwise disturb the settling action therein.

I believe that the operation and advantages of my invention will be well understood from the foregoing description. In the use of my invention, a more effective primary treatment is accomplished and the subsequent handling and treatment of the sewage material is greatly improved.

I claim:

1. The method of subjecting raw untreated sewage to primary treatment in a single horizontally elongated treating unit which includes the steps of feeding the raw untreated sewage material directly into the inlet end of an elongated aeration zone, discharging diffused air into the material so fed and before it is passed beyond said aeration zone to effect aeration of such a character as to free floatable substances from the suspended solids contained therein, directly discharging from the treating unit at the outlet end of the aeration zone the floatable substances that rise to the top of said zone, passing the material directly after aeration thereof from the outlet end of the aeration zone into the bottom portion only of the inlet end of an elongated zone of quiescent settling which is sufficiently isolated from the aeration zone as to be unaffected by the agitation created in the latter zone whereby the remaining floatable substances will rise to the top of the quiescent settling zone and settleable solids will accumulate on the bottom thereof, collecting the settled solids from the bottom of the quiescent settling zone and discharging the same into a solids receiving zone located within the limits of said settling zone, discharging from the treating unit the solids collected in said solids receiving zone, collecting the floatable substances from the top of said quiescent settling zone toward, and directly discharging the same from the treating unit at, the inlet end of the settling zone, and discharging the clarified effluent from the treating unit at the outlet end of the quiescent settling zone.

2. The method according to claim 1, wherein the settled solids from the bottoms of both the aeration zone and the quiescent settling zone are collected and discharged into a solids receiving zone located within the limits of the quiescent settling zone.

3. The method according to claim 1, wherein the settled solids from the bottoms of both the aeration zone and the quiescent settling zone are collected and discharged into a solids receiving zone located in the bottom of the inlet end of the quiescent settling zone and beneath the location where the material from the aeration zone is passed into the quiescent settling zone.

4. The method according to claim 1, wherein the floatable substances from both the aeration zone and the quiescent settling zone are discharged from the treating unit at a common point which is located between the outlet and inlet ends, respectively, of said zones.

5. The method according to claim 1, wherein the aeration to which the raw sewage material is subjected within the aeration zone is of such a character as to prevent the settling of settleable solids in said zone.

LAWRENCE E. LANGDON.

REFERENCES CITED

The following references are of record in the file of this patent:

UNITED STATES PATENTS

| Number | Name | Date |
|---|---|---|
| 2,215,185 | Lund | Sept. 17, 1940 |
| 2,322,017 | Hartman | June 15, 1943 |
| 2,370,974 | Langdon | Mar. 6, 1945 |